(12) United States Patent
Goldhammer et al.

(10) Patent No.: US 12,269,126 B2
(45) Date of Patent: Apr. 8, 2025

(54) STAND, AND SOLDERING SYSTEM WITH STAND AND SOLDERING DEVICE

(71) Applicant: ERSA GmbH, Wertheim (DE)

(72) Inventors: Yannik Goldhammer, Heimbuchenthal (DE); Elmar Müller, Dorfprozelten (DE)

(73) Assignee: ERSA GmbH, Wertheim (DE)

( * ) Notice: Subject to any disclaimer, the term of this patent is extended or adjusted under 35 U.S.C. 154(b) by 64 days.

(21) Appl. No.: 18/037,449

(22) PCT Filed: Nov. 8, 2021

(86) PCT No.: PCT/EP2021/080858
§ 371 (c)(1),
(2) Date: May 17, 2023

(87) PCT Pub. No.: WO2022/106227
PCT Pub. Date: May 27, 2022

(65) Prior Publication Data
US 2023/0339033 A1  Oct. 26, 2023

(30) Foreign Application Priority Data
Nov. 18, 2020  (DE) ..................... 10 2020 130 467.6

(51) Int. Cl.
*B23K 3/02* (2006.01)
*B23K 3/03* (2006.01)

(52) U.S. Cl.
CPC .............. *B23K 3/027* (2013.01); *B23K 3/026* (2013.01); *B23K 3/0361* (2013.01)

(58) Field of Classification Search
None
See application file for complete search history.

(56) References Cited

U.S. PATENT DOCUMENTS 3,705,680 A * 12/1972 Siegel ................... B23K 3/027
219/242
3,919,524 A   11/1975 Fortune
(Continued)

FOREIGN PATENT DOCUMENTS

CN        211840504 U    11/2020
DE   202006009775 U1     8/2006
(Continued)

OTHER PUBLICATIONS

International Search Report and Written Opinion for PCT/EP2021/080858, filed Nov. 8, 2021. pp. 1-7. Mailing date of Search Report Feb. 1, 2022.
(Continued)

*Primary Examiner* — Devang R Patel
(74) *Attorney, Agent, or Firm* — BOND, SCHOENECK & KING, PLLC; George R. McGuire

(57) ABSTRACT

The invention relates to a stand of a soldering system and to a soldering system. In addition to the stand, the soldering system includes an electric soldering device, in particular a soldering iron, with a handle, a heating element provided on the handle, and a soldering tip assembly which can be releasably secured to the handle and has a holding element. The stand has at least one exchangeable holder which is formed about an insertion axis and is designed to at least partly complement a holding element such that a soldering tip assembly arranged on the handle can be introduced into the exchangeable holder along the insertion axis, and the exchangeable holder has an anti-rotation element which interacts with the holding element such that, when the soldering tip assembly is inserted into the exchangeable holder, the holding element is rotationally fixed in the exchangeable holder when the handle is rotated from the securing position into the removal position.

16 Claims, 5 Drawing Sheets

(56) References Cited

U.S. PATENT DOCUMENTS

| | | | | |
|---|---|---|---|---|
| 3,990,623 | A * | 11/1976 | Fortune | B23K 3/027 |
| | | | | 248/176.2 |
| 4,459,463 | A * | 7/1984 | Knowles | B23K 3/03 |
| | | | | 219/229 |
| 5,048,742 | A * | 9/1991 | Fortune | B23K 3/033 |
| | | | | 219/242 |
| 5,248,076 | A * | 9/1993 | Eisele | B23K 3/0369 |
| | | | | 219/229 |
| 6,710,304 | B2 * | 3/2004 | Yokoo | B23K 3/02 |
| | | | | 228/55 |
| 7,731,074 | B2 * | 6/2010 | Martin | B23K 3/022 |
| | | | | 228/53 |
| 8,276,855 | B2 * | 10/2012 | Teraoka | B23K 3/027 |
| | | | | 248/314 |
| 9,095,197 | B2 * | 8/2015 | Rizzuto | A45D 1/20 |
| 9,687,927 | B2 * | 6/2017 | Stuckey | B23K 3/028 |
| 10,751,822 | B2 * | 8/2020 | Nguyen | B23K 3/025 |
| 2013/0270324 | A1 | 10/2013 | Miyazaki et al. | |
| 2017/0165771 | A1 * | 6/2017 | Teraoka | B23K 3/029 |
| 2019/0240756 | A1 | 8/2019 | Weissenberger | |

FOREIGN PATENT DOCUMENTS

| | | |
|---|---|---|
| DE | 202008005867 U1 | 7/2008 |
| DE | 202012008255 U1 | 12/2013 |
| DE | 102018102792 B3 | 5/2019 |
| GB | 759851 A | 10/1956 |
| GB | 862584 A | 3/1961 |
| JP | 2010105032 A | 5/2010 |
| WO | 9102618 A1 | 3/1991 |
| WO | 2017194261 A1 | 4/2017 |

OTHER PUBLICATIONS

International Preliminary Report on Patentability, dated Oct. 12, 2021.

Translated Spanish Office Action, Application No. 202390025, dated Nov. 5, 2024, Entire document.

Translated Japanese Office Action, Application No. 2023-526142, dated May 7, 2024, pp. 1-5.

* cited by examiner

STAND, AND SOLDERING SYSTEM WITH STAND AND SOLDERING DEVICE

CROSS-REFERENCE TO RELATED APPLICATION

The present application is a U.S. National Stage application based on International Application PCT/EP2021/080858, filed Nov. 8, 2021, which claims priority to German Application No. 10 2020 130 467.6, filed Nov. 18, 2020, the entirety of each of which is hereby incorporated by reference.

BACKGROUND

The invention relates to a stand for a soldering system, and to a soldering system having an electric soldering device, and in particular a soldering iron, and having a stand. In this case, it is provided that the soldering device have a handle having a heating element and a soldering tip assembly which can be releasably secured to the handle and has a holding element, wherein the soldering tip assembly is secured to the handle by means of a bayonet-type fastening such that the handle can be brought from a securing position into a removal position by rotating the handle relative to the holding element and can be removed from the removal position in the proximal direction of the soldering tip assembly.

Such a soldering device is, for example, the high-performance soldering iron i-TOOL HIGH POWER (Article No. 0240CDJ) of the applicant. For receiving the soldering device, it is known to provide a stand in which the soldering device can be deposited.

The soldering device can in particular be held at the handle and guided by a human. By providing the heating element, the soldering tip is heated to melt solder. Depending upon the soldering task, soldering tips of different geometric shapes are to be provided. The soldering tips are therefore releasably arranged on the handle. Screw connections, bayonet connections, and latching systems are known in particular.

Further electric soldering devices are known from WO 2017/194261A1, DE 20 2012 008 255 U1, or DE 10 2018 102 792 B3. Electric soldering devices are also known from DE 20 2008 005 867 U1 and U.S. Pat. No. 5,048,742 A.

SUMMARY OF THE INVENTION

The present invention is based upon the object of providing a stand and an associated soldering system in which the soldering tip assembly is replaceable in a simple manner.

This object is achieved by means of a stand having at least one exchangeable holder formed about an insertion axis, which holder is designed to be complementary to the holding element at least in portions, in such a way that a soldering tip assembly arranged on the handle can be inserted into the exchangeable holder and moved out of the exchangeable holder along the insertion axis, and that the exchangeable holder have an anti-rotation element that interacts with the holding element in such a way that, when a soldering tip assembly is inserted into the exchangeable holder, the holding element is arranged in a rotationally-secure manner in the exchangeable holder when the handle is rotated out of the securing position into the removal position.

The stand is consequently provided for the permanent deposition of at least one soldering tip assembly, and preferably several—in particular, differently designed—soldering tip assemblies. Preferably, the stand also has a soldering device receptacle for depositing the soldering device. The design of the stand is therefore such that the hot soldering tip assembly located on the handle is inserted into the exchangeable holder, and the bayonet-type connection can be released there. A release of the bayonet-type connection takes place in this case without the operator's fingers having to contact the soldering tip assembly, and in particular the holding element of the soldering tip assembly. Overall, the operator is thus protected from burns. The operator also does not require a tool for changing the soldering tip.

In this case, the stand can be present as a separate unit in addition to an electronics station which supplies the soldering device with electrical energy. However, it is also conceivable that the stand be formed by such an electronics station or be integrated therein.

In order to provide the anti-rotation lock, it is advantageous if the anti-rotation element has a raised and/or sunken structure which interacts with a counter structure provided on the holding element.

In this context, the holding element can have a parallel knurling on its surface, wherein the anti-rotation element is then designed as at least one rib extending in parallel with the parallel knurling. The anti-rotation element preferably comprises several such ribs which interact with the parallel knurling and in particular with knurled webs formed by the parallel knurling. Due to the conical design, when the soldering tip assembly is inserted into the exchangeable holder, it is ensured that the ribs on the exchangeable holder side come into engagement with the parallel knurling, in order to achieve a rotationally-secure arrangement of the holding element, and thus of the soldering tip assembly in the exchangeable holder.

The exchangeable holder is preferably funnel-like and conically tapering, i.e., becomes narrower in the distal direction. Distal means facing away from the operator, and proximal means facing the operator. Preferably, the holding element can also be designed in a correspondingly conical manner, such that the exchangeable holder ultimately has a conical surface which is designed to be complementary to the holding element. A secure insertion of the holding element into the exchangeable holder can thereby be provided. Because the exchangeable holder has an anti-rotation element, in order to release the soldering tip assembly from the handle, the handle can be rotated about its longitudinal axis, relative to the soldering tip assembly which is rotationally fixed in the exchangeable holder, from the securing position into the removal position.

It has been found that the soldering tip assembly can adhere to the heating element after use of the soldering device. In order to prevent the soldering tip assembly from also being removed, when the handle is removed in the proximal direction, it is advantageously provided that a retaining element be provided in or on the exchangeable holder, wherein the exchangeable holder is then designed in such a way that the soldering tip assembly can be inserted into the exchangeable holder in an insertion position along the insertion axis, and can be moved out of the exchangeable holder, and that a soldering tip assembly present in the exchangeable holder can be pivoted from the insertion position into a withdrawal position in which the holding element engages below the retaining element. As a result of the engagement below, the soldering tip assembly is withdrawn from the heating element during the proximal removal of the handle, and remains in the exchangeable holder.

It is furthermore advantageous if the exchangeable holder has an insertion opening on its proximal side and a bottom opening on its distal side. In this case, it is advantageous if the at least one exchangeable holder is funnel-shaped, in such a way that the funnel-shaped design on the one hand specifies the insertion position, and on the other the withdrawal position. The insertion opening can in particular be elongate or oval, such that a soldering tip assembly present in the exchangeable holder can be pivoted from the insertion position into the withdrawal position. In contrast, the bottom opening can be circular.

The retaining element can be provided on or in the region of the insertion opening such that, when the soldering tip assembly is pivoted into the removal position, it engages behind the holding element. The rear engagement is such that the holding element is held securely in the exchangeable holder when the handle, in the removal and withdrawal position, is withdrawn in the proximal direction. The retaining element can in particular be designed as a projection, which, in the radial direction, is formed so as to protrude towards the insertion axis.

Furthermore, it is advantageous if an insertion stop for contact of the holding element in the axial direction is provided in or on the exchangeable holder. If, consequently, the holding element is inserted into the exchangeable holder in the distal direction, a defined insertion depth of the holding element into the exchangeable holder can be predetermined by providing the insertion stop. This makes it possible to achieve that the holding element not be able to clamp in the exchangeable holder, which usually happens when two conical parts are inserted into one another without a depth stop. It is advantageous in this case if the insertion stop is provided on or in the region of the bottom opening. In this case, the insertion stop can be designed as a projection which, in the radial direction, is formed so as to protrude towards the insertion axis.

It is further advantageous if at least one exchangeable holder has a lateral opening for the lateral insertion of the soldering tip assembly. The design is preferably such that a soldering tip, of which the free end has a diameter that is larger than the bottom opening, can be inserted laterally into the exchangeable holder.

The stand can have a central region having a soldering device receptacle for the soldering device, and can have several exchangeable holders laterally adjacent to the soldering device receptacle. This results in a favorable and clear assembly. Furthermore, additional functional portions, such as storage compartments for accessory parts, can be provided by the stand.

In this case, it is advantageous if the stand is designed in one, two, or multiple parts and has at least one receiving compartment for, in particular, accessory parts, an exchangeable holder, a storage location for, in particular, soldering tips, and a soldering device receptacle, wherein the at least one receiving compartment and/or the storage location is arranged facing the operator. In this way, two different cleaning agents, for example, such as sponge and wool, can be used at the same time, accessibly for the user.

Furthermore, it is conceivable that a reading device for reading a coding provided on the soldering tip assembly be provided in or on the stand. The coding can be provided in particular on the holding element as an optically-readable coding for identifying the soldering tip assembly.

The coding is in particular a two-dimensional coding—for example, in the form of a bar code or QR code. The coding can also be designed as an RFID code. The coding can be provided, for example, on a radially-recessed surface of the holding element and can be imprinted, for example, by means of pad printing. Particularly when the holding element is made of plastic, a two-dimensional coding is particularly advantageous, since the plastic does not change color, even at higher temperatures. The pad printing can in particular be carried out using a white color, in order to optimize the contrast to the plastic used, which is preferably black or dark gray.

The provision of such a coding has the advantage that it is evident which soldering tip is used. For example, it is conceivable for the reading device to be provided on a stand, in which the soldering tips can be deposited. After a soldering tip has been received, it can be guided past the reading device such that it is possible to record which soldering tip is used. Furthermore, it is conceivable that, after selection of a suitable soldering tip, it be possible to check whether the selected soldering tip is actually the desired soldering tip. However, the reading device can also be provided as a separate unit or on an electronics station which supplies the soldering device with electrical energy.

By means of a sunken arrangement of the coding on the radially-recessed surface, the coding is permanently protected against abrasion and further environmental influences. Overall, permanent readability of the coding is thereby ensured. Each type of soldering tip assembly is assigned a separate coding, such that the identification of the soldering tip assembly is unambiguous. The information detected by the reading device can be further processed by means of software. The read data can be structured and displayed for a user in readable form. It is also conceivable for the data to be machine-processed by means of database software or an MES (manufacturing execution system)—in particular, also for process monitoring. A specific soldering tip can thus be assigned to a specific soldering task, and this, on the one hand, be brought to the user's attention, and, on the other, also checked.

The above-mentioned object is also achieved by a soldering system that has a soldering device, an electronics station for supplying the soldering device with electrical energy, and a stand according to the invention.

In order to arrange the handle on the soldering tip assembly, it is advantageous if the holding element, on its proximal side, has recesses and, between the recesses, rear engagement portions which, on their distal side, provide contact portions, and if the handle, between the heating element and a proximal hand portion, has counter portions for contact on the contact portions. The counter portions can then be inserted into the recesses and fastened in a bayonet-like manner by rotating the handle relative to the holding element.

Furthermore, it is advantageous if the soldering tip assembly comprises a sleeve extending about a longitudinal axis, a soldering tip provided at the distal end of the sleeve, and the holding element, wherein a spring element provided between the holding element and the sleeve is provided, which pushes the holding element in the distal direction.

Further details and advantageous embodiments of the invention can be found in the following description, on the basis of which an embodiment of the invention is described and explained in more detail.

DETAILED DESCRIPTION

Figure 1:
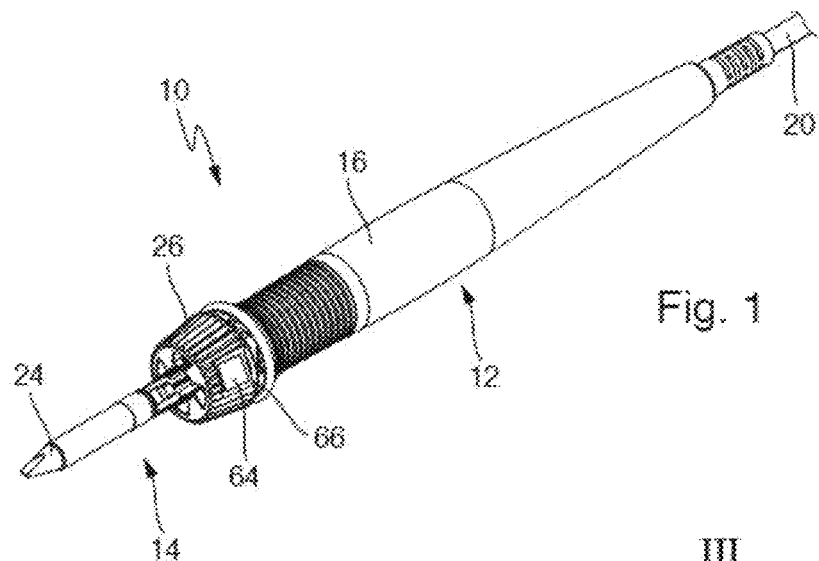
FIG. 1 shows a soldering device having a handle and a soldering tip assembly mounted thereon.
Figure 2:
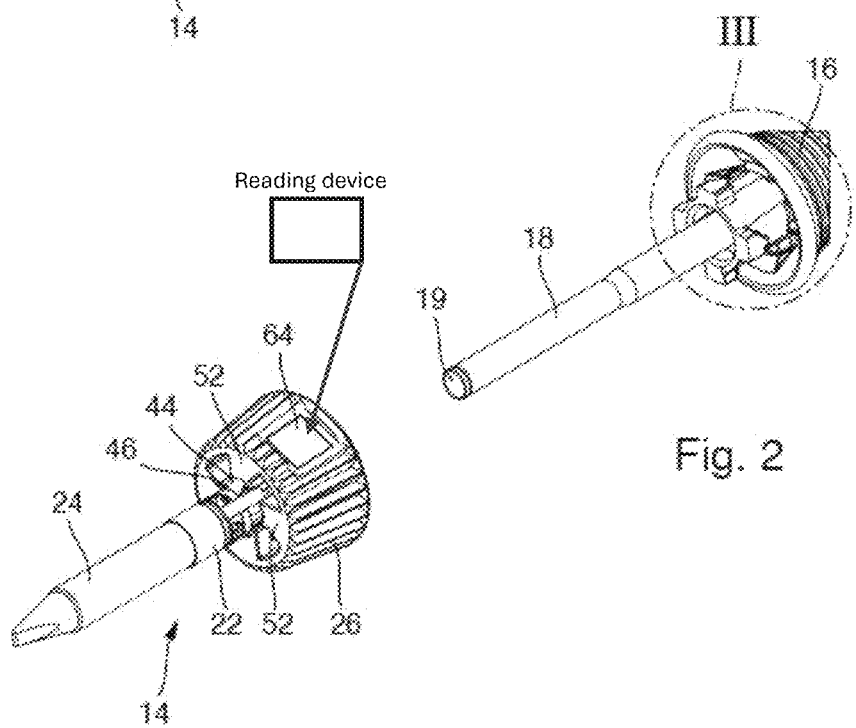
FIG. 2 shows the soldering tip assembly according to FIG. 1 in a view when released from the handle.

FIG. 1 shows a soldering device 10 in the form of a soldering iron, which comprises a handle 12 and a soldering tip assembly 14. At its proximal end, the handle 12 comprises a hand portion 16 which can be gripped by a user. As is clear from FIG. 2, the handle 12 further comprises, at the distal end thereof, a rod-shaped heating element 18 having a free end 19, wherein the replaceable soldering tip assembly 14 is ultimately heated using the heating element 18. As is clear from FIG. 1, a connecting cable 20 is provided on the side, facing away from the heating element 18, of the hand portion 16, by means of which cable the soldering device 10 can be supplied with current.

As is clear from FIGS. 2, 4, 5, 6, 7, and 8, the soldering tip assembly 14 has a sleeve 22, at the distal end of which a soldering tip 24 is fastened. The sleeve 22 can have window-like recesses 21. In the embodiment shown in the figures, the soldering tip 24 is designed as a part formed separately from the sleeve 22, but it is also conceivable for the soldering tip 24 to be formed in one piece and/or integrally with the sleeve 22.

The soldering tip assembly 14 further provides a holding element 26, which is arranged around a longitudinal axis 23 and surrounds the sleeve 22 in a ring-like manner, at least in portions, and which is designed to taper conically towards the soldering tip 24. On its surface, the holding element 26 has a parallel knurling formed by knurled ribs 27. The holding element 26 serves to place the soldering tip assembly 14 onto the handle 12 or to release it therefrom. While the soldering tip 24 and the sleeve 22 are made of a metal material, the holding element 26 is preferably made of a suitable plastic.

Figure 3:
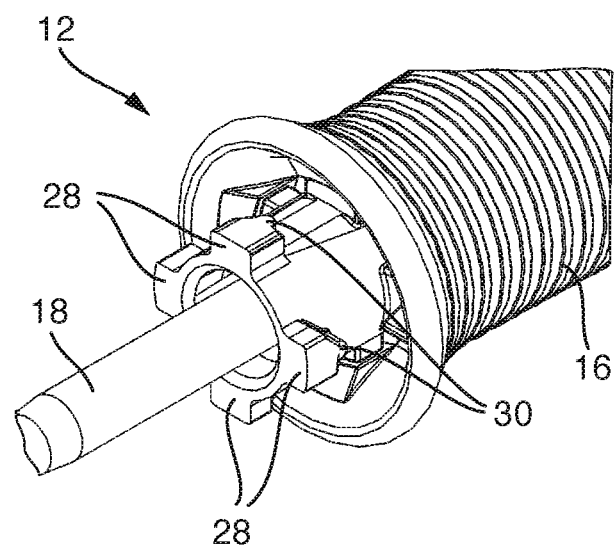
FIG. 3 is an enlarged view of the cutout III from FIG. 2.

As is clear from the enlarged detail according to FIG. 3, the handle 12 has rib-like counter portions 28 in the region between the heating element 18 and the hand portion 16. In total, four counter portions 28 are provided, which are arranged opposite one another. The individual counter portions 28 have latching lugs 30 on their proximal side, which lugs extend in the axial direction.

Figure 4:
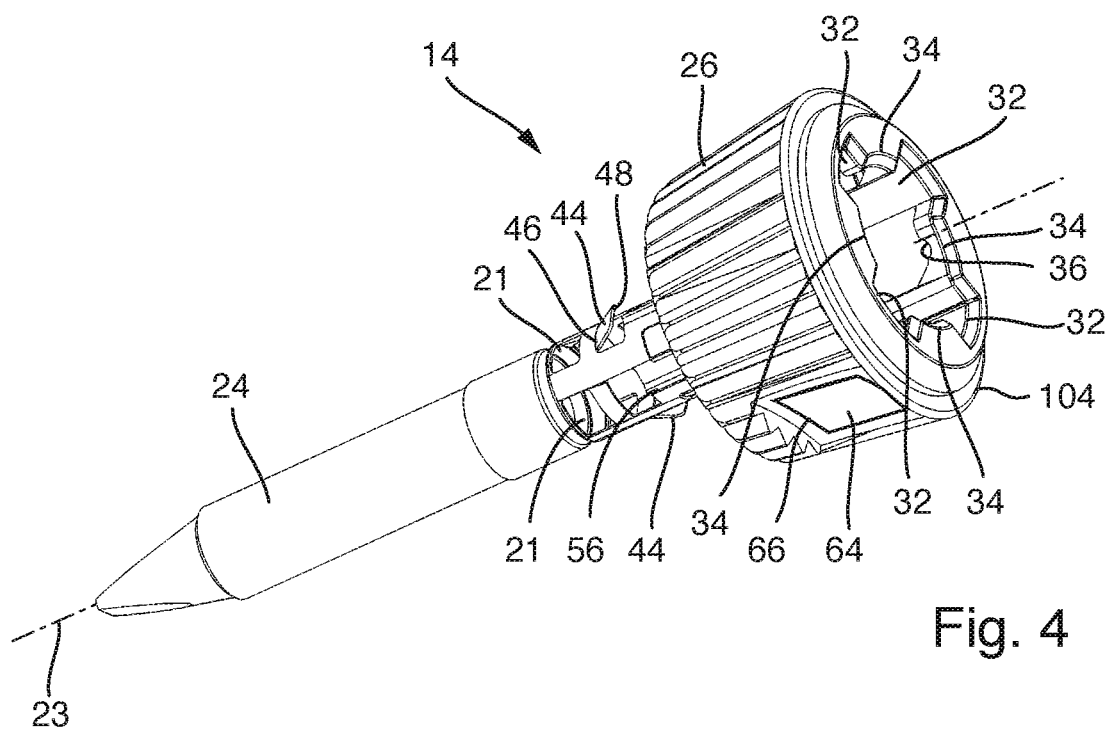
FIG. 4 is an oblique view from behind of the soldering tip assembly according to FIG. 2.
Figure 5:
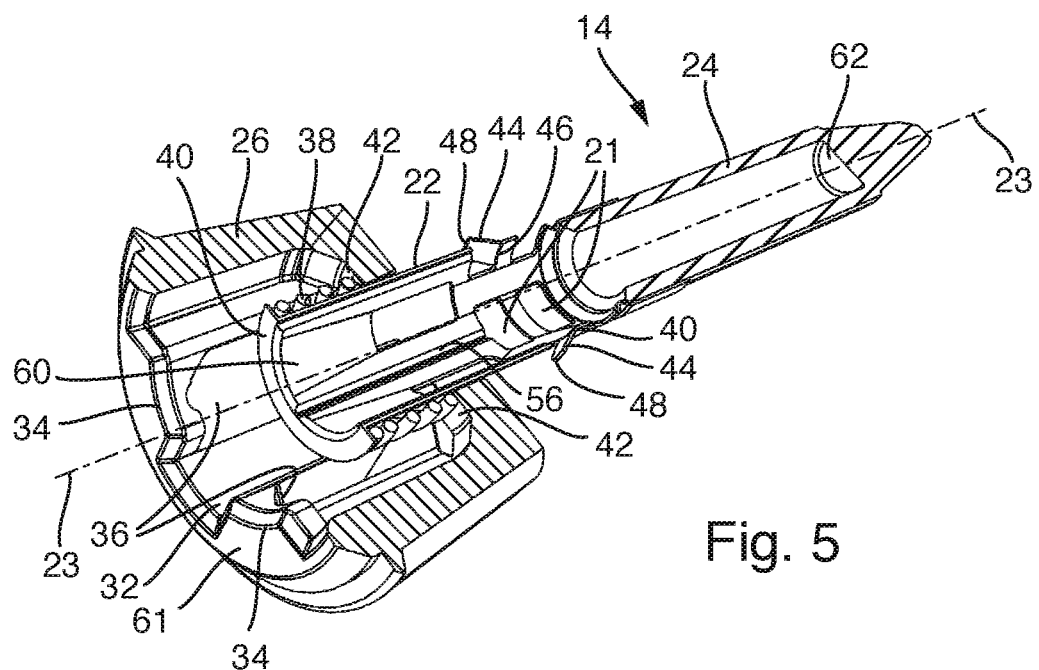
FIG. 5 is a longitudinal section through the soldering tip assembly according to FIG. 4.

As is clear from FIGS. 4 and 5, which show the soldering tip assembly 14 having the soldering tip 24 deflected in the distal direction, the holding element 26 has four recesses 32 on its proximal side, into which recesses the counter portions 28 can be inserted in the axial direction. A rear engagement portion 34 projecting inwards in the radial direction is provided between in each case two recesses 32. On their distal side, the rear engagement portions 34 have contact portions 36 which serve for receiving the counter portions 28 or the latching lugs 30 thereof. The contact portions 36 are designed to be complementary to the latching lugs 30, such that they can come to rest in the contact portions 36 in a defined and secure manner.

It is clear from the section according to FIG. 5 that the soldering tip assembly 14 also has a spring element 38, in addition to the soldering tip 24, the sleeve 22, and the holding element 26. The spring element 38 is arranged between the sleeve 22 and the holding element 26 such that it pushes the holding element 26 away from the hand portion 16 in the distal direction. The spring element 38 is designed as a coil spring and surrounds the sleeve 22. At the proximal end of the sleeve 22, the sleeve has an opening 60 and a flange portion 40, protruding in the radial direction, against which the spring element 38 acts. Opposite the flange portion 40, the holding element 26 has a proximal inner side 42 which faces the flange portion 40 and surrounds the sleeve 22, and against which the spring element 38 also acts. The spring element 38 is arranged and pretensioned in such a way that, as already described, it pushes the holding element 26 on the sleeve 22 in the distal direction.

In order to arrange the holding element 26, which is in particular formed in one piece and in particular from plastic, captively on the sleeve 22, the sleeve has stop means 44 which prevent the sleeve 22, together with the soldering tip 24, from being able to be withdrawn from the holding element 26 in the proximal direction. As is clear in particular from FIGS. 4 and 5, two mutually-opposite stop means 44 are provided, which project beyond the sleeve 22 in the radial direction. The stop means 44 are formed integrally with the sleeve and realized as deployment tongues. For this purpose, a bending point 46 is provided at the respective tongue foot, along which point the stop means 44 are bent outwards in the radial direction. The free ends 48 of the stop means 44 face the holding element 26.

Figure 6:
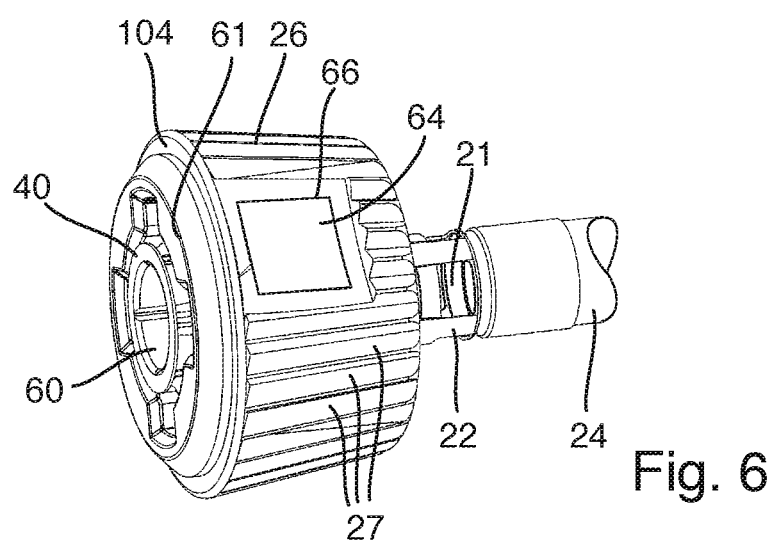
FIG. 6 is an oblique view, from behind, of the holding element of the soldering tip assembly.
Figure 7:
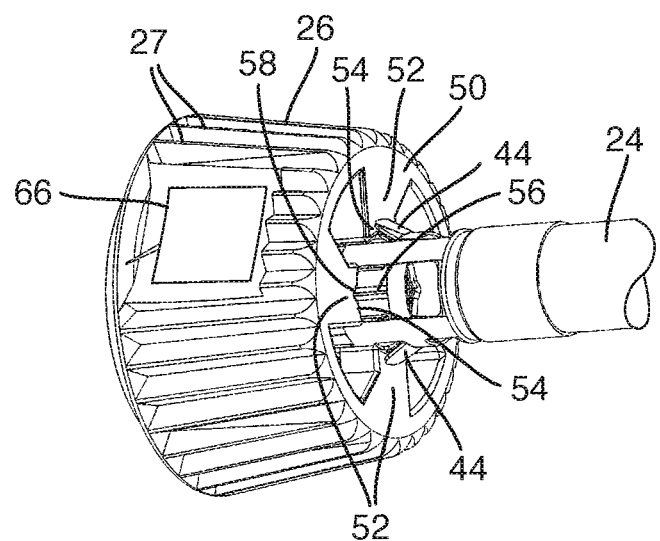
FIG. 7 is an oblique view, from the front, of the holding element of the soldering tip assembly.

FIGS. 6 and 7 show the soldering tip assembly 14, wherein, in this case, the free ends 48 of the stop means 44 come to rest on the distal end face 50 of the holding element 26 due to the spring force. The end face 50 of the holding element 26 provides radially inward-projecting shoulders 52, the free ends 54 of which serve to axially guide the sleeve. The free ends 48 of the stop means 44 come to rest on the distal upper side of the shoulders 52; the end face 50 or the shoulders 52 thereby form a stop limit. As is also clear from FIG. 7, the sleeve 22 has guide contours extending in the axial direction in the form of beads 56, which are visible in particular in FIGS. 5 and 7. Complementary to the beads 56, recesses 58 extending in the radial direction are provided at the free ends 54 of the shoulders 52.

This has the advantage that the holding element 26 cannot twist with respect to the sleeve 22, and thus a rotation of the soldering tip 24 is prevented. This is important particularly in the case of soldering tasks in which the soldering tip has to be held at a certain angle. A further advantage is that the free ends 48 of the stop means 44 are reliably supported on the shoulders 52.

As is clear in particular from FIGS. 5 and 6, in the non-mounted, neutral state of the soldering tip assembly 14, the flange portion 40 rests with the opening 60 in the same plane as the proximal side 61 of the holding element 26. This has the advantage that the holding element 26 is largely protected when the free end of the heating element 18 is inserted. It would also be conceivable that the opening 60 project with the flange portion 40 beyond the holding element 26 in the proximal direction.

Figure 8:
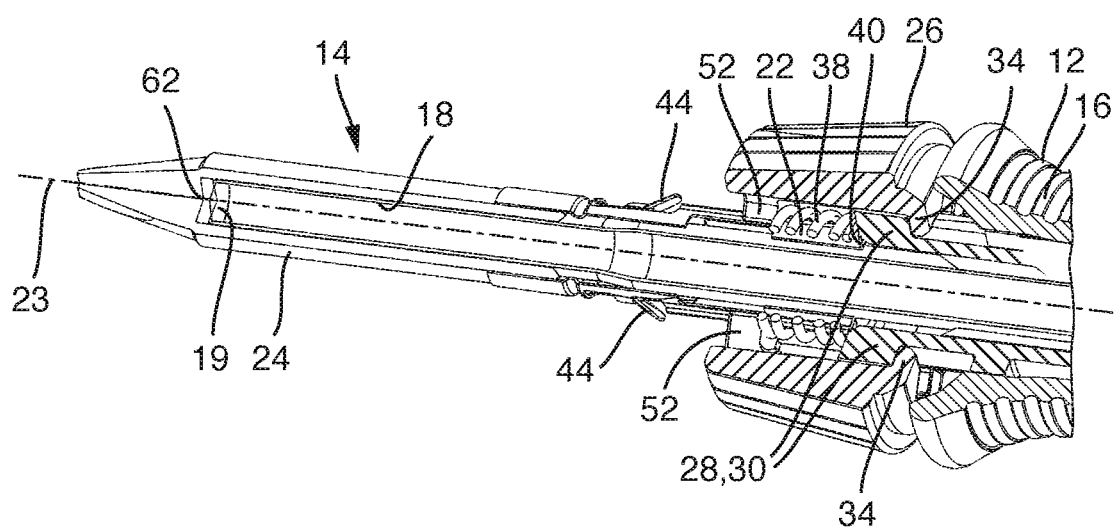
FIG. 8 is a section through a soldering tip assembly arranged on the handle.

FIG. 8 shows the soldering tip assembly 14 mounted on the handle 12. In order to secure the soldering tip assembly 14 on the handle, the rear engagement portions 34 are acted upon in the distal direction, on account of the spring force of the spring element 38, against the counter portions 28 having the latching lugs 30.

The soldering tip assembly is mounted on the handle 12 as follows:

First, the free end 19 of the heating element 18 is inserted into the opening 60 of the sleeve 22. The heating element 18 is inserted into the sleeve 22, and then into the soldering tip 24, until the free end 19 of the heating element 18 acts against a stop portion 62 provided in the soldering tip 24. As is clear from FIGS. 5 and 8, the soldering tip 24 is formed in the manner of a blind hole and has the stop portion 62 on its base. After the free end 19 of the heating element 18 acts against the stop portion 62, the soldering tip 24 is pushed in the distal direction, against the force of the spring element 38, when the heating element 18 is moved further in the distal direction. Consequently, the holding element 26 is moved against the spring effect, relative to the soldering tip 24 or to the heating element 18, along the longitudinal axis 23. At the same time, the counter portions 28 enter the recesses 32 on the holding element 26. Thereafter, the holding element 26 is twisted, relative to the heating element 24, about the longitudinal axis 23, such that the counter portions 28 or their lugs 30 come to rest against the rear engagement portions 34. In the mounting position, the latching lugs 30 are then pushed against the contact portions 36 due to the spring force of the spring element 38. As a result, the spring element 38 has the effect that, on the one hand, the free end 19 of the heating element is pushed against the stop portion 62 of the soldering tip 24, for functionally reliable heat conduction and, if necessary, also temperature measurement, and that, on the other hand, the counter portions 28 having the latching lugs 30 come to rest securely in the contact portions 36 of the holding element 26.

As is clear from FIGS. 1, 2, 4, 6, and 7, a coding 64 in the form of a two-dimensional code is provided on the holding element 26. The coding 64 is such that it is readable using a reading device, and the soldering tip 24 or soldering tip assembly 14 used in each case can be identified. The holding element 26 has, on its radial periphery, a radially-recessed surface 66, on which the coding 64 is provided. As a result, the coding 64 is reliably protected in particular against damage or abrasion. The coding can in particular be a bar code or QR code imprinted using pad printing. It is also conceivable to provide an RFID chip or tags as coding.

Figure 9:
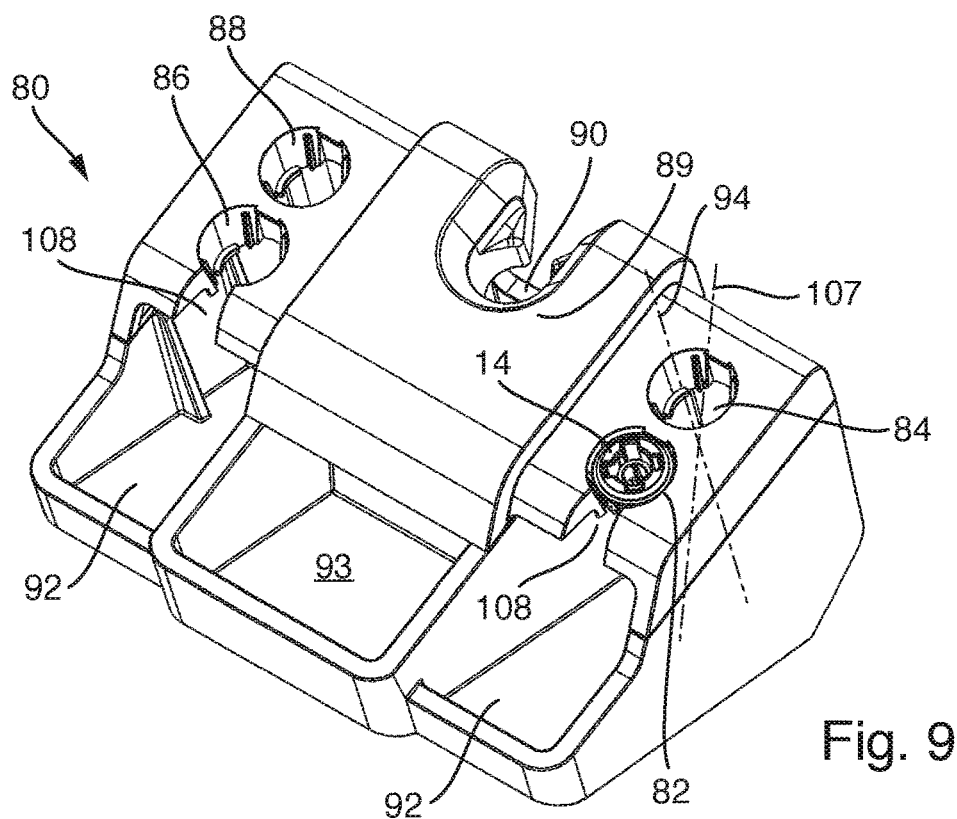
FIG. 9 shows a stand for a soldering tip assembly.
Figure 10:
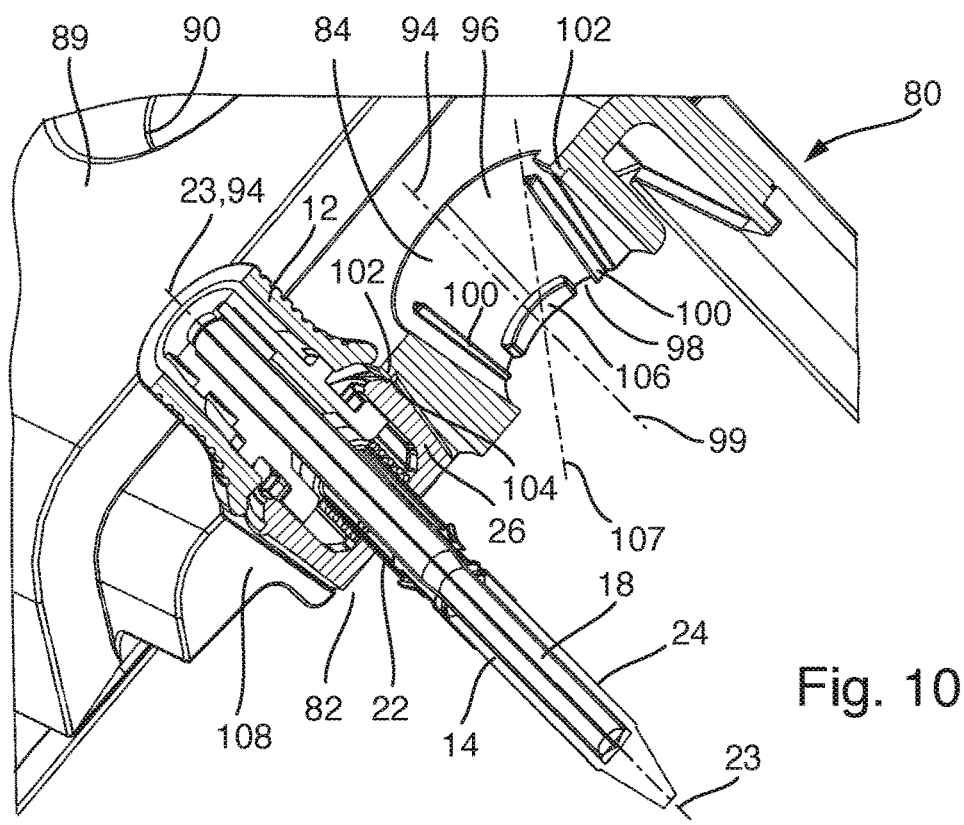
FIG. 10 is a section through the stand according to FIG. 9, having a soldering tip assembly.

FIGS. 9 and 10 show a stand 80 for depositing the soldering device 10 and for depositing various soldering tip assemblies 14. The stand 80 is designed to be placed on a planar surface, and in particular a table. The stand 80 shown has a total of four, funnel-shaped, exchangeable holders 82, 84, 86, and 88 on its upper side, wherein a soldering tip assembly 14 is provided in the exchangeable holder 82. Furthermore, a soldering device receptacle 90, in which the soldering device 10 can be placed, is provided in a central region 89. The exchangeable holders 82, 84, 86, and 88 are provided so as to be laterally adjacent to the soldering device receptacle 90. The stand 80 further has, on its side facing the operator, receiving compartments 92 for receiving small parts and accessory parts, as well as a storage location 93 for soldering tips.

In this case, the stand 80 can be present as a separate unit, in addition to an electronics station which supplies the soldering device with electrical energy. However, it is also conceivable that the stand 80 be formed by such an electronics station or be integrated therein.

As is clear in particular from FIG. 10, the exchangeable holders 82, 84, 82, 88 are each designed to taper conically about an insertion axis 94, in the distal direction. The cone of the exchangeable holders 82, 84, 82, 88 is formed so as to be complementary to the cone of the holding element 26 in portions, such that the holding portion 26 of the respective soldering tip assembly 14 comes to rest securely in an exchangeable holder 82, 84, 86, 88. The exchangeable holders 82, 84, 86, 88 have an insertion opening 96 on their proximal upper side and a bottom opening 98 on their distal underside. The insertion opening 96 is elongate or oval, and the bottom opening 98 is round, such that a pivoting between the insertion position and a withdrawal position is possible. Overall, the diameter of the insertion opening 96 is larger than the diameter of the bottom opening 98, such that the conical design results.

As is clear in particular from the section according to FIG. 10, anti-rotation elements 100 in the form of ribs are provided on the inner surface of the exchangeable holders 82, 84, 86, 88, which ribs are located in planes extending through the insertion axis 94. It is conceivable for one rib or several ribs to be provided in each case. The anti-rotation elements 100 are formed so as to protrude in the radial direction towards the insertion axis 94. The anti-rotation elements 100 are also designed such that, in order to secure the rotation of the holding element 26, they interact with the parallel knurlings provided on the respective holding element 26, or engage between two knurled ribs 27. However, the anti-rotation elements are also conceivable in an orthogonal arrangement with respect to the axis 94—for example, on the surface of the insertion stop 106.

A soldering tip assembly 14 inserted into an exchangeable holder 82, 84, 86, and 88 is thereby held in a torsion-proof manner in the stand 80. By providing the total of four exchangeable holders 82, 84, 86, and 88 shown in FIG. 9, a total of four different soldering tip assemblies 14 can consequently remain in the exchangeable holders 82, 84, 86, and 88 shown there.

It is also clear from the section according to FIG. 10 that a retaining element 102 is provided in the region of the respective insertion opening 96, which retaining element serves to retain a soldering tip assembly 14, inserted into the respective exchangeable holders 82, 84, 86, 88 and pivoted into a withdrawal position, during the proximal removal of the handle 12. In this case, the respective retaining element 102 engages behind an annular shoulder 104 provided on the holding element 26, in the withdrawal position, such that the holding element 26, and thus the soldering tip assembly 14, remains securely in the stand 80 when the handle is withdrawn in the proximal direction. The retaining element 102 is designed as a projection which is formed so as to protrude in the radial direction towards the insertion axis 94. In order that the soldering tip assembly 14 be able to be moved, together with the annular shoulder 104, under the retaining element 102, the exchangeable holders 82, 84, 86, 88 are formed to be oval on the insertion opening. The soldering tip assembly can thus be pivoted or tilted from the insertion axis 94 towards a withdrawal axis 107. It is also conceivable for the retaining elements 102 to have a certain resilient ability to yield. By means of the retaining element 102, the soldering tip assembly 14 can be securely separated from the handle with the heating element—particularly in the case of a possible adhesion of the soldering tip 24 to the heating element 18. However, if a soldering tip assembly 14 fastened to the handle 12 is to be removed from the respective exchangeable holder 82 through 88, this can take place along the axis 94 without damaging the holding element 26 and/or the retaining element 102.

As is further apparent from the section according to FIG. 10, insertion stops 106 are provided in the region of the bottom opening 98. The insertion stops 106 make it possible for the distal sides of the respective holding element 26 to come to rest against the proximal upper side of the respective insertion stop 106. It can thereby be achieved that the holding element 26 not become jammed in the exchangeable holder.

The insertion stops 106 are formed as projections which are formed so as to protrude in the radial direction towards the insertion axis 94. The design is furthermore such that the holding element 26 can be pivoted or tilted, on the surface of the insertion stop 106, between the two axes 94 and 107. In this case, the respective insertion stop 106 is designed such that the anti-rotation elements 100 are always in engagement with the parallel knurling 27 when the holding element 26 is tilted between the axes 94 and 107, and thus twisting of the holding element is avoided during the entire tilting movement.

In this case, the two exchangeable holders 82 and 86 are designed to be open at the edges and have a lateral opening 108 for laterally inserting or removing soldering tip assemblies 14. As a result, soldering tip assemblies 14 can also be inserted into the exchangeable holders 82 and 86, which assemblies have a soldering tip the dimensions of which are greater than the diameter of the bottom opening 98.

By providing the exchangeable holders 82 through 88 shown in FIGS. 9 and 10, a change of a soldering tip assembly 14 can consequently take place in a simple manner. A soldering tip assembly 14 arranged on the handle 12 is inserted into an exchangeable holder 82, 84, 86, or 88 along the axis 94 until the distal side of the holding element 26 comes to rest against the proximal upper side of the insertion stops 106. In addition, at least one of the anti-rotation elements 100 engages in the parallel knurling 27 provided on the holding element 26, such that the holding element 26 is arranged in a rotationally-secure manner in the respective exchangeable holder 82. If the handle 12 is then actuated further, against the spring force of the spring element 34, in the distal direction, the counter portions 28 or the latching lugs 30 thereof move out of the contact portions 36. In order to release the bayonet-type fastening of the soldering tip assembly 14 to the handle 12, the handle 12 is twisted relative to the soldering tip assembly 14 until the handle-side counter portions 28 enter the holding-element-side recesses 32, and the handle 12, together with the heating element 18, can be removed from the soldering tip assembly 14 in the proximal direction. Then, if the heating element 18 should adhere to the soldering tip 24, the handle 12 can be pivoted or tilted, starting from the axis 94, about a pivot point 99, towards the axis 107, until the retaining element 102 engages behind the holding element 26 or the annular shoulder 104 thereof, as shown in FIG. 10. As a result, the respective retaining element 102 retains the soldering tip assembly 14 securely in the respective exchangeable holder 82 through 88, and undesired removal from the respective exchangeable holder 82 through 88 is prevented.

If a different soldering tip assembly 14 is then to be fastened to the handle 12, the heating element 18 can be inserted into the opening 60 of a sleeve 22, deposited on the stand 80, of a soldering tip assembly 14. In this case, the insertion has to be carried out in such a way that the counter portions 28 provided on the handle 12 engage in the recesses 32 provided on the holding element 26. After overcoming the spring force of the spring element 38, the handle 12 is rotated relative to the respective holding element 26, such that the latching lugs 30 of the counter portions 28 engage with the contact portions 36 of the rear engagement portions 34, such that the soldering tip assembly 14 is fastened to the handle 12 in a bayonet-like manner.

After the latching lugs 30 have come to rest on the contact portions 36, the handle 12, together with the selected soldering tip assembly 14, can be guided out of the respective exchangeable holder 82 through 88 in the proximal direction. It is then guided out along the axis 94.

The described change of the soldering tip assembly 14 has the advantage that the change can take place without manual contact of the holding element 26, and thus without a risk of burning on the holding element 26. The operator holds only the handle 12 of the soldering device 10; the soldering tip assemblies 14 can be securely accommodated in the respective exchangeable holders 82 through 88.

Furthermore, the reading device for reading the coding 66 provided on the respective soldering tip 14 can be arranged in or on the stand 80. After the soldering tip assembly 14 has been changed, the respective holding element 26, having the coding 64, can be guided past the reading device, such that the respective soldering tip assembly 14 or the associated soldering tip 24 can be identified. In an alternative embodiment, a reading device for an RFID chip or tag is installed in the stand, in order to thus already provide a message about the soldering tip used directly upon receiving or changing the soldering tip assembly 14.

The invention claimed is:

1. Stand for a soldering system, wherein the soldering system comprises, in addition to the stand, an electric soldering device having a handle a heating element provided on the handle, and a soldering tip assembly that can be releasably secured to the handle and has a holding element, wherein the soldering tip assembly is secured to the handle by a bayonet-type fastening, such that the handle can be brought from a securing position into a removal position by rotating the handle relative to the holding element and can be removed from the removal position in the proximal direction of the soldering tip assembly, wherein the stand has at least one exchangeable holder which is formed about an insertion axis and is designed to at least partly complement the holding element such that a soldering tip assembly arranged on the handle can be introduced into the exchangeable holder along the insertion axis, and that the exchangeable holder has an anti-rotation element which interacts with the holding element such that, when the soldering tip assembly is inserted into the exchangeable holder, the holding element is rotationally fixed in the exchangeable holder when the handle is rotated from the securing position into the removal position.

2. Stand according to claim 1, characterized in that the anti-rotation element has a raised and/or sunken structure which interacts with a counter structure for anti-rotation, provided on the holding element.

3. Stand according to claim 2, characterized in that the counter structure is designed as a parallel knurling, and the structures are designed as at least one rib extending in parallel with the parallel knurling.

4. Stand according to claim 1, characterized in that a retaining element is provided in or on the exchangeable holder, that the exchangeable holder is designed such that the soldering tip assembly can be inserted into the exchangeable holder in an insertion position along the insertion axis, and that a soldering tip assembly present in the exchangeable holder can be pivoted from the insertion position into a pull-off position in which the holding element of the soldering tip assembly engages under the retaining element of the exchangeable holder, so that when the handle is removed proximally, the soldering tip assembly is pulled off the heating element and remains in the exchangeable holder.

5. Stand according to claim 1, characterized in that the at least one exchangeable holder is funnel-shaped, such that the funnel-shaped design on the one hand specifies the insertion position, and on the other the withdrawal position.

6. Stand according to claim 4, characterized in that the exchangeable holder has an insertion opening, and that the retaining element is provided on or in the region of the insertion opening.

7. Stand according to claim 6, characterized in that the insertion opening is elongate or oval, such that a soldering tip assembly present in the exchangeable holder can be pivoted out of the insertion position into the pull-off position.

8. Stand according to claim 1, characterized in that an insertion stop for contact of the holding element in the axial direction is provided in or on the exchangeable holder.

9. Stand according to claim 1, characterized in that at least one exchangeable holder has a lateral opening for lateral insertion of soldering tip assembly.

10. Stand according to claim 1, characterized in that the stand has a central region having a soldering device receptacle for the soldering device and, laterally adjacent to the soldering device receptacle, several exchangeable holders.

11. Stand according to claim 1, characterized in that the stand is formed in multiple parts and has at least one receiving compartment, an exchangeable holder, a storage location, and a soldering device receptacle.

12. Stand according to claim 1, characterized in that a reading device for reading a coding provided on the soldering tip assembly is provided in or on the stand.

13. Soldering system having a soldering device, an electronics station for supplying the soldering device with electrical energy, and a stand, wherein the soldering device has a handle having a heating element and a soldering tip assembly that can be releasably secured to the handle and has a holding element, wherein the soldering tip assembly is secured to the handle by a bayonet-type fastening such that the handle can be brought from a securing position into a removal position by rotating the handle relative to the holding element and can be removed from the removal position in the proximal direction of the soldering tip assembly, wherein the stand has at least one exchangeable holder which is formed about an insertion axis and is designed to at least partly complement the holding element such that a soldering tip assembly arranged on the handle can be introduced into the exchangeable holder along the insertion axis, and that the exchangeable holder has an anti-rotation element which interacts with the holding element such that, when the soldering tip assembly is inserted into the exchangeable holder, the holding element is rotationally fixed in the exchangeable holder when the handle is rotated from the securing position into the removal position.

14. Soldering system according to claim 13, characterized in that a readable coding for identifying the soldering tip assembly is provided on the holding element, and in that a reading device for reading the coding is provided in or on the stand or on the electronics station.

15. Soldering system according to claim 13, characterized in that the holding element, on its proximal side, has recesses and, between the recesses, rear engagement portions which, on their distal sides, provide contact portions, and in that the handle, between the heating element and a proximal hand portion, has counter portions for contact on the contact portions.

16. Soldering system according to claim 13, characterized in that the soldering tip assembly comprises a sleeve extending about a longitudinal axis, a soldering tip provided at the distal end of the sleeve, and the holding element which surrounds the sleeve in a ring-like manner at least in portions, wherein a spring element is provided between the holding element and the sleeve such that the spring element pushes the holding element in the distal direction.

* * * * *